(12) United States Patent
Esser et al.

(10) Patent No.: US 7,951,265 B2
(45) Date of Patent: *May 31, 2011

(54) AQUEOUS SLURRIES OF FINELY DIVIDED FILLERS, THEIR PREPARATION AND THEIR USE FOR THE PRODUCTION OF FILLER-CONTAINING PAPERS

(75) Inventors: Anton Esser, Mannheim (DE); Volker Braig, Weinheim (DE); Martin Wendker, Worms (DE); Rainer Blum, Mannheim (DE); Peter Baumann, Boehl-iggelheim (DE); Josef Neutzner, Neustadt (DE); Jacques Dupuis, Ketsch (DE); Hans-Joachim Haehnle, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 657 days.

This patent is subject to a terminal disclaimer.

(21) Appl. No.: 11/082,904

(22) Filed: Mar. 18, 2005

(65) Prior Publication Data

US 2005/0197278 A1 Sep. 8, 2005

Related U.S. Application Data

(63) Continuation-in-part of application No. PCT/EP2004/003347, filed on Mar. 30, 2004.

(51) Int. Cl.
*C09C 1/02* (2006.01)
*C09C 3/10* (2006.01)
*D21H 17/46* (2006.01)
*D21H 17/69* (2006.01)

(52) U.S. Cl. ........... 162/166; 162/158; 162/164.6; 162/181.1; 526/314; 526/317.1; 106/400; 106/401

(58) Field of Classification Search ............... 162/158, 162/164.6, 166, 181.1; 526/314, 317.1; 106/400, 106/401

See application file for complete search history.

(56) References Cited

U.S. PATENT DOCUMENTS

| | | | | |
|---|---|---|---|---|
| 2,861,059 A | * | 11/1958 | Mowry et al. | 525/369 |
| 4,799,964 A | * | 1/1989 | Harvey et al. | 106/436 |
| 4,880,497 A | * | 11/1989 | Pfohl et al. | 162/135 |
| 5,008,321 A | | 4/1991 | Hartmann et al. | |
| 5,435,921 A | * | 7/1995 | Collins et al. | 210/727 |
| 5,630,907 A | | 5/1997 | Nilz et al. | |
| 6,057,404 A | | 5/2000 | Utecht et al. | |
| 6,132,558 A | * | 10/2000 | Dyllick-Brenzinger et al. | 162/164.6 |
| 6,184,310 B1 | * | 2/2001 | Utecht et al. | 525/359.4 |
| 6,833,401 B1 | | 12/2004 | Xue et al. | |
| 2002/0088579 A1 | | 7/2002 | Forsberg et al. | |

FOREIGN PATENT DOCUMENTS

| | | |
|---|---|---|
| EP | 0 251 182 A1 | 1/1988 |
| EP | 0 528 409 A1 | 2/1993 |
| EP | 0 672 212 B1 | 9/1995 |
| JP | 8-59740 | 3/1996 |
| WO | WO 94/13882 | 6/1994 |
| WO | WO 00/17250 | 3/2000 |
| WO | WO 01/29106 A1 | 4/2001 |

OTHER PUBLICATIONS

Smook, Gary A., Handbook for Pulp and Paper Technologists, 2nd ed, Angus Wilde Publications, 1992, p. 220.*
Smook, G.A., Handbook for Pulp and Paper Technologists, 2nd ed, Angus Wilde Publications, 1992, p. 225.*

* cited by examiner

*Primary Examiner* — Matthew J Daniels
*Assistant Examiner* — Dennis Cordray
(74) *Attorney, Agent, or Firm* — Oblon, Spivak, McClelland, Maier & Neustadt, L.L.P.

(57) ABSTRACT

Aqueous slurries of finely divided fillers which are at least partly coated with polymers and which are obtainable by treating aqueous slurries of finely divided fillers with at least one water-soluble amphoteric copolymer
whose structures are identified in the specification are used as an additive to the paper stock in the production of filler-containing paper, filler-containing cardboard or filler-containing board by draining of the paper stock.

19 Claims, No Drawings

AQUEOUS SLURRIES OF FINELY DIVIDED FILLERS, THEIR PREPARATION AND THEIR USE FOR THE PRODUCTION OF FILLER-CONTAINING PAPERS

This application is a CIP of PCT/EP04/03347, filed Mar. 30, 2004 which claims priority to German Application No. 103 15 363.2, filed Apr. 30, 2003.

DESCRIPTION

The present invention relates to aqueous slurries of finely divided fillers which are at least partly coated with polymers, processes for their preparation and their use as an additive to the paper stock in the production of filler-containing paper, filler-containing cardboard and filler-containing board.

EP-B-0 251 182 discloses, inter alia, a process for the preparation of polymers, a mixture of N-vinylformamide and acrylonitrile or methacrylonitrile being polymerized in the presence of free radical initiators and the polymers then being modified by treatment with acids. The modified polymers contain vinylamine units in the form of salts, vinyl-formamide and acrylonitrile or methacrylonitrile units and, if required, acrylamide and acrylic acid units. Reworking of examples from this publication has, however, shown that the polymers hydrolyzed with acids contain considerable amounts of amidine units of the formula

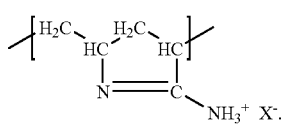

(I)

The hydrolyzed polymers are used in papermaking as drainage aids and retention aids and for strengthening paper.

EP-B-0 528 409 discloses cationic copolymers which contain from 20 to 90 mol % of amidine units. They are prepared by copolymerization of N-vinylformamide and acrylonitrile and subsequent hydrolysis of the copolymers with acids. The polymers containing amidine units are used as flocculants for sludges.

EP-B-0 672 212 relates to the use of copolymers which are obtainable by copolymerization of N-vinylcarboxamides, monoethylenically unsaturated carboxylic acids and, if required, vinyl acetate, N-vinylpyrrolidone and/or N-vinylimidazole and, if required, monomers having at least two double bonds in the molecule and subsequent partial or complete hydrolysis of the vinylcarboxamide units present in the copolymers to give amino or ammonium groups, as an additive to the paper stock in papermaking for increasing the drainage rate and the retention as well as the dry and wet strength of the paper. As analyses have shown, hydrolyzed copolymers of N-vinylformamide and acrylic acid contain considerable amounts of amidine units of the formula

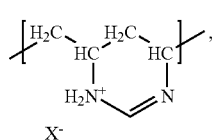

(II)

where X⁻ is an anion.

JP-A-08059740 discloses that amphoteric water-soluble polymers are added to aqueous suspensions of inorganic particles, at least a part of the polymers being adsorbed on the filler surface. The amphoteric polymers are preferably prepared by hydrolyzing copolymers of N-vinylformamide, acrylonitrile and acrylic acid in the presence of acids. They contain from 20 to 90 mol % of amidine units of the structure

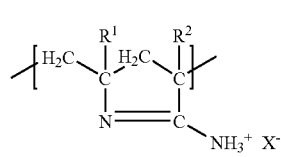

(I)

where $R^1$ and $R^2$ are each H or methyl and $X^-$ is an anion. The filler slurries treated with such polymers are added to the paper stock in the production of filler-containing papers. The filler treatment leads to an improvement in the drainage of the paper stock and also results in an improvement in various strength properties of the dried paper and an improvement in the filler retention.

US-A-2002/0088579 describes the pretreatment of inorganic fillers with cationic, anionic and amphoteric (zwitterionic) polymers. In each case, the treatment consists of at least two stages. Treatment with a cationic polymer followed by treatment with an anionic polymer is recommended. In further steps, further cationic and anionic polymers can be alternately adsorbed. The aqueous suspensions comprising the pretreated filler particles are added to the paper stock in the production of filler-containing paper. The filler treatment leads to an improvement in various strength properties of the dried paper.

It is an object of the present invention to provide further aqueous slurries of finely divided fillers which can be used in papermaking.

We have found that this object is achieved, according to the invention, by aqueous slurries of finely divided fillers which are at least partly coated with polymers, the slurries being obtainable by treating of aqueous slurries of finely divided fillers with at least one water-soluble amphoteric copolymer which is obtainable by copolymerization of (a) at least one N-vinylcarboxamide of the formula

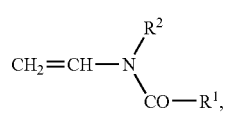

(III)

where $R^1$ and $R^2$ are H or $C_1$- to $C_6$-alkyl, (b) at least one monoethylenically unsaturated carboxylic acid having 3 to 8 carbon atoms in the molecule and/or the alkali metal, alkaline earth metal or ammonium salts thereof and, if required, (c) other monoethylenically unsaturated monomers which are free of nitrile groups and, if required, (d) compounds which have at least two ethylenically unsaturated double bonds in the molecule and subsequent partial or complete elimination of the groups —CO—$R^1$ from the monomers III incorporated in the form of polymerized units in the copolymer.

The aqueous slurries contain, for example, from 1 to 50, preferably from 10 to 40, % by weight of at least one finely divided filler. The amount of amphoteric water-soluble polymer is, for example, from 0.1 to 5, preferably 0.25-3, % by weight, based on fillers.

The present invention also relates to a process for the preparation of aqueous slurries, from 0.1 to 5% by weight, based on filler, of at least one copolymer which is obtainable by copolymerization of
(a) at least one N-vinylcarboxamide of the formula

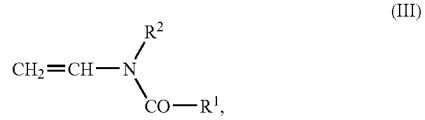

where $R^1$ and $R^2$ are H or $C_1$- to $C_6$-alkyl,
(b) at least one monoethylenically unsaturated carboxylic acid having 3 to 8 carbon atoms in the molecule and/or the alkali metal, alkaline earth metal or ammonium salts thereof and, if required,
(c) other monoethylenically unsaturated monomers which are free of nitrile groups and, if required,
(d) compounds which have at least two ethylenically unsaturated double bonds in the molecule
and subsequent partial or complete elimination of the groups —CO—$R^1$ from the monomers III incorporated in the form of polymerized units in the copolymer being added to an aqueous slurry of at least one finely divided filler, or the aqueous slurry of at least one finely divided filler being introduced into an aqueous solution of said amphoteric copolymer and the components being mixed in each case.

The molar mass of the water-soluble amphoteric polymers is, for example, at least 10 000, preferably at least 100 000, in particular at least 500 000, Dalton.

The present invention furthermore relates to the use of the aqueous slurries described above as an additive to the paper stock in the production of filler-containing paper, filler-containing cardboard or filler-containing board by drainage of the paper stock.

Suitable fillers are all pigments which can be customarily used in the paper industry, e.g. calcium carbonate, which can be employed in the form of ground calcium carbonate (GCC), chalk, marble or precipitated calcium carbonate (PCC), talc, kaolin, bentonite, satin white, calcium sulfate, barium sulfate and titanium dioxide. Mixtures of two or more pigments may also be used. For example, from 40 to 90% of the particles of the finely divided fillers have a diameter of less than 2 μm.

The fillers are processed to an aqueous slurry, for example, by introduction in water. Precipitated calcium carbonate is usually suspended in water in the absence of dispersants. In order to prepare aqueous slurries of the other fillers, an anionic dispersant, e.g. polyacrylic acids having an average molar mass Mw of, for example, from 1 000 to 40 000 Dalton, is generally used. If an anionic dispersant is used, for example, from 0.01 to 0.5, preferably from 0.2 to 0.3, % by weight thereof is employed for the preparation of aqueous filler slurries. The finely divided fillers dispersed in water in the presence of anionic dispersants are anionic. The aqueous slurries contain, for example, from 10 to 30, in general 15-25, % by weight of at least one filler. In specific cases, it is also possible to use pigments which were milled without dispersants or milling assistants. Such pigments (e.g. GCC) are milled as a rule at relatively low solids content and then used immediately after the milling as a filler in papermaking.

In order to prepare the novel aqueous slurries of finely divided fillers, aqueous slurries of finely divided fillers, anionically dispersed if necessary, are treated with at least one water-soluble amphoteric polymer. For example, from 0.1 to 5% by weight, based on fillers, of a water-soluble amphoteric polymer can be added to an aqueous slurry containing from 1 to 50% by weight of at least one finely divided filler, or an aqueous slurry of a finely divided filler can be introduced into an aqueous solution of an amphoteric polymer and the components mixed in each case. The treatment of the aqueous slurry of finely divided filler with the amphoteric polymers can be carried out continuously or batchwise. On combination of aqueous slurries of finely divided fillers and aqueous solutions of amphoteric polymers, the filler particles are at least partly coated or impregnated with the amphoteric polymers. The mixing of the components is effected, for example, in a shear field. In general, it is sufficient if the components are stirred after combination or are treated in a shear field of an Ultraturrax apparatus. The combination and mixing of the components of the aqueous slurries can be effected, for example, at from 0 to 95° C., preferably from 10 to 70° C. In general, the components are mixed at from the respective room temperature to 40° C. The pH of the aqueous filler slurries treated with amphoteric polymers is, for example, from 5 to 11, preferably from 6 to 9, the pH of calcium carbonate-containing slurries preferably being more than 6.5.

The water-soluble amphoteric copolymers are disclosed in EP-B-0 672 212, mentioned as prior art. They are prepared by copolymerization of
(a) at least one N-vinylcarboxamide of the formula

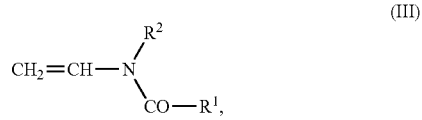

where $R^1$ and $R^2$ are H or $C_1$- to $C_6$-alkyl,
(b) at least one monoethylenically unsaturated carboxylic acid having 3 to 8 carbon atoms in the molecule and/or the alkali metal, alkaline earth metal or ammonium salts thereof and, if required,
(c) other monoethylenically unsaturated monomers which are free of nitrile groups and, if required,
(d) compounds which have at least two ethylenically unsaturated double bonds in the molecule
and subsequent partial or complete elimination of the groups —CO—$R^1$ from the monomers III incorporated in the form of polymerized units in the copolymer. Aqueous slurries of finely divided fillers which are treated with amphoteric copolymers which are obtainable by copolymerization of
(a) N-vinylformamide,
(b) acrylic acid, methacrylic acid and/or the alkali metal or ammonium salts thereof and, if required,
(c) other monoethylenically unsaturated monomers which are free of nitrile groups
and subsequent partial or complete hydrolysis of the vinylformamide units contained in the copolymers, in the presence of acids, e.g. hydrochloric acid, or of bases, such as sodium hydroxide solution or potassium hydroxide solution, are preferred. The hydrolysis of the vinylformamide units with acids or bases results in vinylamine and/or amidine units of the formula

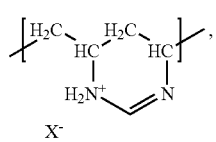

where X⁻ is an anion. The originally anionic copolymer acquires cationic groups thereby and thus becomes amphoteric. The hydrolysis of the monomer units III incorporated in the form of polymerized units can also be effected enzymatically. The amidine units form by reaction of neighboring vinylamine units with vinylformamide units. For the amphoteric copolymers, the sum of vinylamine units and amidine units which form from the N-vinylcarboxamides incorporated in the form of polymerized units is always stated below.

Examples of monomers of group (a) are N-vinylformamide, N-vinyl-N-methylformamide, N-vinylacetamide, N-vinyl-N-methylacetamide N-vinyl-N-ethylacetamide, N-vinyl-N-methylpropionamide and N-vinylpropionamide. The monomers of group (a) can be used alone or as a mixture in the copolymerization with the monomers of the other groups.

Suitable monomers of group (b) are monoethylenically unsaturated carboxylic acids of 3 to 8 carbon atoms and the water-soluble salts of these carboxylic acids. This group of monomers includes, for example, acrylic acid, methacrylic acid, dimethacrylic acid, ethacrylic acid, maleic acid, fumaric acid, itaconic acid, mesaconic acid, citraconic acid, methylenemalonic acid, allylacetic acid, vinylacetic acid and crotonic acid. The monomers of this group can be used alone or as a mixture with one another, in partly or in completely neutralized form, in the copolymerization. For example, alkali metal or alkaline earth metal bases, ammonia, amines and/or alkanolamines are used for the neutralization. Examples of these are sodium hydroxide solution, potassium hydroxide solution, sodium carbonate, potassium carbonate, sodium bicarbonate, magnesium oxide, calcium hydroxide, calcium oxide, triethanolamine, ethanolamine, morpholine, diethylenetriamine or tetraethylenepentamine.

For modification, the copolymers can, if required, contain monomers of group (c) in the form of polymerized units, which monomers are free of nitrile groups, e.g. methyl acrylate, ethyl acrylate, N-butyl acrylate, isobutyl acrylate, isobutyl methacrylate, methyl methacrylate, ethyl methacrylate, vinyl acetate, vinyl propionate, N-vinylpyrrolidone, N-vinylimidazole, acrylamide and/or methacrylamide.

A further modification of the copolymers is possible by using in the copolymerization monomers (d) which contain at least two double bonds in the molecule, e.g. methylenebisacrylamide, glycol diacrylate, glycol dimethacrylate, glyceryl triacrylate, pentaerythrityl triallyl ether, polyalkylene glycols or polyols which are at least diesterified with acrylic acid and/or methacrylic acid, such as pentaerythritol, sorbitol or glucose. If at least one monomer of group (d) is used in the copolymerization, the amounts used are up to 2 mol %, e.g. from 0.001 to 1 mol %.

The copolymerization of the monomers is effected in a known manner, cf. EP-B-0 672 212, page 4, lines 13-37. The hydrolysis of the copolymers is described on page 4, lines 38-58 and on page 5, lines 1-25 of said European Patent. Hydrolyzed copolymers for which the hydrolysis was carried out in the presence of acids are preferably used. The degree of hydrolysis of the vinylcarboxamide groups incorporated in the form of polymerized units is, for example, from 1 to 98, in general from 10 to 98, preferably from 20 to 60, mol %.

The hydrolyzed copolymers contain, for example, (I) from 1 to 98, preferably from 1 to 75, mol % of vinylcarboxamide units, (II) from 1 to 98, preferably from 1 to 55, mol % of units of at least one monoethylenically unsaturated carboxylic acid of 3 to 8 carbon atoms and (III) from 1 to 98, preferably from 1 to 55, mol % of vinylamine and/or amidine units of the formula

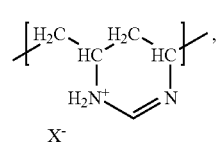

where X⁻ is an anion, and, if required, (IV) up to 30 mol % of units of other monoethylenically unsaturated compounds which are free of nitrile groups.

Particularly preferred hydrolyzed copolymers are those which contain (I) from 5 to 70 mol % of vinylformamide units, (II) from 15 to 45 mol % of acrylic acid and/or methacrylic acid units and (III) from 10 to 50 mol % of vinylamine units in salt form and amidine units of the formula II.

The amphoteric copolymers may carry an excess anionic or an excess cationic charge or may be electrically neutral if equal numbers of anionic and cationic groups are present in the copolymer. Depending on the charge state of the amphoteric copolymers, the aqueous filler slurries prepared therewith are anionic, cationic or electrically neutral if the amphoteric copolymers comprise equal quantities of cationic and anionic charge.

Preferably used amphoteric copolymers are those which have a charge density of, preferably, not more than 1 meq/g at pH 7, both in the anionic and in the cationic range.

In the examples, percentages are by weight, unless evident otherwise from the context. The electrophoretic mobility or the zeta potential were determined by a laser optical method. For electrophoresis measurements, the samples were diluted with an aqueous KCl solution (e.g. 10 mmol) to a concentration of 1% by volume for the measurement. The measuring instrument used was the Zetasizer 3000 HS from Malvern Instruments Ltd.

The molar masses Mw of the polymers were determined with the aid of static light scattering. The measurements were carried out at pH 7.6 in a 10 millimolar aqueous sodium chloride solution.

The composition of the polymers was determined with the aid of $^{13}$C-NMR spectroscopy. For this purpose, the signals of the following carbon atoms were integrated. The solvent used was $D_2O$.

| Group | Signal position [ppm] | Area |
|---|---|---|
| —COONa | 185 | A (acrylate) |
| HCOO⁻ | 172 | A (formate) |
| —NHCOH | 164-174[1)] | A (formamide) |
| —N=CH—N— | 152 | A (amidines) |

[1)]Several signals

The fractions of the individual monomer units in mol % are obtained using the following formulae:

| | |
|---|---|
| Acrylic acid: | 100 · A (acrylate)/[A (acrylate) + A (formate) + A (formamide) + A (amidines)] |
| Vinylamine: | 100 · A (formate)/[A (acrylate) + A (formate) + A (formamide) + A (amidines)] |
| Vinylformamide: | 100 · A (formamide)/[A (acrylate) + A (formate) + A (formamide) + A (amidines)] |
| Amidines: | 100 · A (amidines)/[A (acrylate) + A (formate) + A (formamide) + A (amidines)] |

Fillers used were precipitated chalk, precipitated calcium carbonate (PCC), ground calcium carbonate (GCC), kaolin and mixtures of said fillers.

EXAMPLE 1

6 g of a 12% strength aqueous solution of an amphoteric copolymer containing 40 mol % of vinylformamide units, 30 mol % of acrylic acid units and 30 mol % of vinyl-amine and amidine units and having a molecular weight Mw of about 600 000 were initially taken in a beaker and then diluted with 30 g of water, 150 g of a 20% strength slurry of precipitated calcium carbonate (PCC) in water were then added. During the addition of the PCC slurry and thereafter, the mixture was stirred with the aid of a Heiltof stirrer at 1 000 revolutions per minute (rpm). The pH of the mixture was then brought to 8.5. The mobility of the filler particles at pH 8.5 and at pH 7 was measured with the aid of microelectrophoresis. The electrophoretic mobility assumed a slightly negative value at both pH settings.

EXAMPLE 2

6 g of a 12% strength aqueous solution of an amphoteric copolymer containing 5 mol % of vinylformamide units, 45 mol % of acrylic acid units and 50 mol % of vinylamine and amidine units and having a molecular weight Mw of about 400 000 were initially taken in a beaker and then diluted with 30 g of water. 150 g of a 20% strength slurry of precipitated calcium carbonate (PCC) in water were then added. During the addition of the PCC slurry and thereafter, the mixture was stirred with the aid of a Heiltof stirrer at 1 000 rpm. The pH of the mixture was then brought to 8.5. The mobility of the filler particles at pH 8.5 and at pH 7 was measured with the aid of microelectrophoresis. The electrophoretic mobility assumed a slightly negative value at both pH settings.

EXAMPLE 3

6 g of a 12% strength aqueous solution of an amphoteric copolymer containing 70 mol % of vinylformamide units, 26 mol % of acrylic acid units and 10 mol % of vinyl-amine and amidine units and having a molecular weight Mw of about 700 000 were initially taken in a beaker and then diluted with 30 g of water. 150 g of a 20% strength slurry of precipitated calcium carbonate (PCC) in water were then added. During the addition of the PCC slurry and thereafter, the mixture was stirred with the aid of a Heiltof stirrer at 1 000 rpm. The pH of the mixture was then brought to 8.5. The mobility of the filler particles at pH 8.5 and at pH 7 was measured with the aid of microelectrophoresis. The electrophoretic mobility assumed a slightly negative value at both pH settings.

EXAMPLE 4

6 g of a 12% strength aqueous solution of an amphoteric copolymer containing 30 mol % of vinylformamide units, 40 mol % of acrylic acid units and 30 mol % of vinyl-amine and amidine units and having a molecular weight Mw of about 400 000 were initially taken in a beaker and then diluted with 30 g of water. 150 g of a 20% strength slurry of precipitated calcium carbonate (PCC) in water were then added. During the addition of the PCC slurry and thereafter, the mixture was stirred with the aid of a Heiltof stirrer at 1 000 rpm. The pH of the mixture was then brought to 8.5. The mobility of the filler particles at pH 8.5 and at pH 7 was measured with the aid of microelectrophoresis. The electrophoretic mobility assumed a slightly negative value at both pH settings.

EXAMPLE 5

6 g of a 12% strength aqueous solution of an amphoteric copolymer containing 30 mol % of vinylformamide units, 30 mol % of acrylic acid units and 40 mol % of vinyl-amine and amidine units and having a molecular weight Mw of about 400 000 were initially taken in a beaker and then diluted with 30 g of water. 150 g of a 20% strength slurry of precipitated calcium carbonate (PCC) in water were then added. During the addition of the PCC slurry and thereafter, the mixture was stirred with the aid of a Heiltof stirrer at 1 000 rpm. The pH of the mixture was then brought to 8.5. The mobility of the filler particles at pH 8.5 and at pH 7 was measured with the aid of microelectrophoresis. The electrophoretic mobility assumed a slightly negative value at both pH settings.

EXAMPLE 6

6 g of a 12% strength aqueous solution of an amphoteric copolymer containing 40 mol % of vinylformamide units, 30 mol % of acrylic acid units and 30 mol % of vinyl-amine and amidine units and having a molecular weight Mw of about 500 000 were initially taken in a beaker and then diluted with 30 g of water. 150 g of a 20% strength slurry of ground calcium carbonate (GCC) in water were then added. During the addition of the PCC slurry and thereafter, the mixture was stirred with the aid of a Heiltof stirrer at 1 000 rpm. The pH of the mixture was then brought to 8.5. The mobility of the filler particles at pH 8.5 and at pH 7 was measured with the aid of microelectrophoresis. The electrophoretic mobility assumed a slightly negative value at both pH settings.

EXAMPLE 6a 6 g of an aqueous solution of an amphoteric copolymer containing 40 mol % of vinyl-formamide units, 30 mol % of acrylic acid units and 30 mol % of vinylamine and amidine units and having a molecular weight Mw of about 500 000 were initially taken in a beaker and then diluted with 30 g of water. 150 g of a 20% strength slurry of ground calcium carbonate (GCC) in water were then added. The addition of the GCC slurry is effected here immediately after the end of the milling process in a laboratory pigment mill. The milling took place in the presence of a dispersant based on polyacrylic acid. As a result of the milling, it was found that about 75% of the GCC particles have a particle size of <2 μm. During the addition of the GCC slurry and thereafter, the mixture was stirred with the aid of a Heiltof stirrer at 100 rpm. The pH of the mixture was then brought to 8.5. The mobility of the filler particles at pH 8.5 and at pH 7 was measured with the aid of microelectrophoresis. The electrophoretic mobility assumed a slightly negative value at both pH settings.

EXAMPLE 6b 6 g of an aqueous solution of an amphoteric copolymer containing 40 mol % of vinyl-formamide units, 30 mol % of acrylic acid units and 30 mol % of vinylamine and amidine units and having a molecular weight Mw of about 500 000 were initially taken in a beaker and then diluted with 30 g of water. 150 g of a 20% strength slurry of ground calcium carbonate (GCC) in water were then added. The addition of the GCC slurry is effected here immediately after the end of the milling process in a laboratory pigment mill. In contrast to Example 6a, no dispersant was used in the pigment milling. As a result of the milling, it was found that about 60% of the GCC particles have a particle size of <2 μm. During the addition of the GCC slurry and thereafter, the mixture was stirred with the aid of a Heiltof stirrer at 100 rpm. The pH of the mixture was then brought to 8.5. The mobility of the filler particles at pH 8.5 and at pH 7 was measured with the aid of microelectrophoresis. The electrophoretic mobility assumed a slightly negative value at both pH settings.

EXAMPLE 7

6 g of a 12% strength aqueous solution of an amphoteric copolymer containing 40 mol % of vinylformamide units, 30 mol % of acrylic acid units and 30 mol % of vinyl-amine and amidine units and having a molecular weight Mw of about 500 000 were initially taken in a beaker and then diluted with 30 g of water. 150 g of a 20% strength slurry of kaolin-clay mixture in water were then added. During the addition of this slurry and thereafter, the mixture was stirred with the aid of a Heiltof stirrer at 1 000 rpm. The pH of the mixture was then brought to 8.5. The mobility of the filler particles at pH 8.5 and at pH 7 was measured with the aid of microelectrophoresis. The electrophoretic mobility assumed a slightly negative value at both pH settings.

COMPARATIVE EXAMPLE 1 ACCORDING TO EXAMPLE 1 OF JP-A-08059740

6 g of a 12% strength aqueous solution of an amphoteric copolymer containing 35 mol % of amidine units of the structure I, 20 mol % of vinylformamide units, 10 mol % of vinylamine units, 5 mol % of acrylic acid units and 30 mol % of nitrile units and having a molar mass Mw of 300 000 Dalton were initially taken in a beaker and then diluted with 30 g of water. The limiting viscosity of the polymers with 2.7 dl/g (measured using an Oswald viscometer in an aqueous NaCl solution at the NaCl content of 0.1 g/dl and 25° C.).

150 g of a 20% strength slurry of precipitated calcium carbonate (PCC) in water were then added. During the addition of the slurry and thereafter, the mixture was stirred with the aid of a Heiltof stirrer at 1 000 rpm. The pH of the mixture was then brought to 8.5. With the aid of microelectrophoresis, the mobility of the filler particles was measured at pH 8.5 and at pH 7. The electrophoretic mobility assumed a slightly negative value at both pH settings.

Production of Filler-Containing Paper

Paper Type A

EXAMPLES 8-14

A mixture of TMP (thermomechanical pulp) and groundwood in a ratio of 70/30 and with a solids concentration of 4% was beaten speck-free in a laboratory pulper until a freeness of 60-65 was reached. The pH of the stock was from 7 to 8. The beaten stock was then diluted to a solids concentration of 0.35% by adding water.

In order to determine the behavior of the aqueous filler slurries described above in the production of filler-containing paper, in each case 500 ml of the paper stock suspension were initially taken and in each case the slurries treated according to the examples and the comparative example and a cationic polyacrylamide as a retention aid (Polymin KE 2020) were metered into these pulps. The amount of retention aid metered was in each case 0.01%, based on solids content of the paper stock suspension, of polymer. The amount of slurry was adjusted with the aid of several preliminary experiments so that the ash content of the paper sheets produced using the stock was 32%. Sheets were also produced using the 20% strength aqueous slurries of precipitated calcium carbonate (PCC slurry), ground calcium carbonate (GCC slurry) and kaolin clay, stated in table 1.

The paper sheets were each produced on a Rapid-Kö then sheet former according to ISO 5269/2 with a sheet weight of 80 g/m$^2$, then dried for 7 minutes at 90° C. and then calendered at a nip pressure of 200 N/cm.

Testing of the Paper Sheets of Type A

After a storage time in a conditioned chamber at a constant 23° C. and 50% relative humidity for 12 hours, the dry breaking length of the sheets, according to DIN 54540, and the porosity of the sheets, according to Bendtsen (ISO 5636-3), were tested. The dry picking resistance was determined using the IGT printability tester (ISO 3783). The results are shown in table 1.

Paper Type B

EXAMPLES 15-22

A mixture of bleached birch sulfate and bleached pine sulfite in a ratio of 70/30 and with a solids concentration of 4% was beaten speck-free in a laboratory pulper until a freeness of 55-60 was reached. An optical brightener (Blankophor® PSG) and a cationic starch (HiCat 5163 A) were then added to the beaten stock. The digestion of the cationic starch was effected in the form of a 10% strength starch slurry in a jet digester at 130° C. and with a residence time of 1 minute. The amount of optical brightener metered was 0.5%, based on the solids content of the paper stock suspension, of commercial product. The amount of cationic starch metered was 0.5%, based on the solids content of the paper stock suspension, of starch. The pH of the stock was from 7 to 8. The beaten stock was then diluted to a solids concentration of 0.35% by adding water.

In order to determine the behavior of the aqueous filler slurries described above in the production of filler-containing paper, in each case 500 ml of the paper stock suspension were initially taken and in each case the slurries treated according to the examples and the comparative example and a cationic polyacrylamide as a retention aid (Polymin KE 2020) were metered into these pulps. The amount of retention aid metered was in each case 0.01%, based on solids content of the paper stock suspension, of polymer. The amount of slurry was adjusted with the aid of several preliminary experiments so that the ash content of the paper sheets produced using the stock was 20%. Sheets were also produced using the 20% strength aqueous slurries of precipitated calcium carbonate (PCC slurry) and ground calcium carbonate (GCC slurry), stated in table 2.

The paper sheets were produced in each case on a Rapid-Köthen sheet former according to ISO 5269/2 with a sheet weight of 80 g/m$^2$ and then dried for 7 minutes at 90° C.

Testing of the Paper Sheets of Type B

After a storage time in a conditioned chamber at a constant 23° C. and 50% relative humidity for 12 hours, the dry breaking length of the sheets, according to DIN 54540, and the internal strength, according to DIN 54516, were determined. The CIE whiteness was determined using a spectrophotometer of the Elrepho SF 400 type according to DIN 5033. The results are shown in table 2.

TABLE 1

| Example | Slurry acc. to Ex. | Dry breaking length (m) | Porosity (ml/min) | IGT |
|---|---|---|---|---|
| 8 | 1 | 2213 | 1675 | very good |
| 9 | 2 | 2086 | 1789 | very good |
| 10 | 3 | 2016 | 1811 | very good |
| 11 | 4 | 1987 | 1698 | good |
| 12 | 5 | 2123 | 1678 | very good |
| 13 | 6 | 2097 | 1756 | very good |
| 14 | 7 | 2145 | 1541 | very good |
| Comparative examples | | | | |
| PCC slurry without pretreatment | | 1356 | 1734 | poor |
| GCC slurry without pretreatment | | 1247 | 1876 | poor |
| Kaolin-clay slurry without pretreatment | | 1415 | 1476 | poor |
| Slurry according to comparative example 1 | | 1745 | 1701 | moderate |

TABLE 2

| Example | Slurry acc. to Ex. | Dry breaking length (m) | CIE whiteness | Internal strength [N] |
|---|---|---|---|---|
| 15 | 1 | 4176 | 114.6 | 23.4 |
| 16 | 2 | 4098 | 112.5 | 22.8 |
| 17 | 3 | 3987 | 113.5 | 22.6 |
| 18 | 4 | 4123 | 111.4 | 23.7 |
| 19 | 5 | 4076 | 113.6 | 23.2 |
| 20 | 6 | 3951 | 118.8 | 22.1 |
| 21 | 6a | 4332 | 118.6 | 24.4 |
| 22 | 6b | 4645 | 118.4 | 27.9 |
| Comparative examples | | | | |
| PCC slurry without pretreatment | | 3285 | 110.7 | 15.6 |
| GCC slurry without pretreatment | | 3020 | 119.4 | 15.2 |
| Slurry according to comparative example 1 | | 3675 | 111.2 | 17.8 |

We claim:

1. An aqueous slurry of finely divided fillers which are at least partly coated with polymers, comprising an aqueous slurry of finely divided fillers treated with at least one water-soluble amphoteric copolymer comprising as constituent monomer units:
   (a) 5 to 70 mol % of N-vinylformamide
   (b) 20 to 45 mol % of at least one monoethylenically unsaturated carboxylic acid selected from the group consisting of acrylic acid and methacrylic acid and/or the alkali metal, alkaline earth metal or ammonium salts thereof and
   (c) 10 to 50 mol % of vinylamine and/or amidine units of the formula

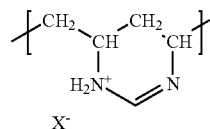

where $X^-$ is an anion.

2. An aqueous slurry as claimed in claim 1, wherein said slurry contains from 1 to 50% by weight of at least one finely divided filler and wherein the amount of said water-soluble amphoteric copolymer is from 0.05 to 5% by weight, based on filler.

3. An aqueous slurry as claimed in claim 1, which contains from 10 to 40% by weight of at least one filler.

4. An aqueous slurry as claimed in claim 1, wherein said water-soluble amphoteric copolymers have a molar mass Mw of at least 10 000.

5. An aqueous slurry as claimed in claim 1, wherein the degree of hydrolysis of the N-vinylformamide groups incorporated in the form of polymerized units is from 10 to 98%.

6. An aqueous slurry as claimed in claim 1, wherein said at least one water-soluble amphoteric copolymer comprises as constituent monomer units (a) from 5 to 70 mol % of vinylformamide units, (b) from 20 to 45 mol % of acrylic acid and/or methacrylic acid units and (c) from 10 to 50 mol % of vinylamine units in salt form and amidine units of the formula

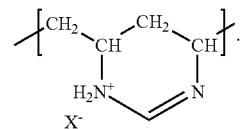

7. An aqueous slurry as claimed in claim 1, wherein said water-soluble amphoteric copolymers carry an excess anionic charge.

8. An aqueous slurry as claimed in claim 1, wherein said water-soluble amphoteric copolymers carry an excess cationic charge.

9. An aqueous slurry as claimed in claim 1, wherein said water-soluble amphoteric copolymers have the same amount of cationic and anionic charge.

10. The aqueous slurry of claim 1 wherein said water-soluble amphoteric copolymer further comprises as constituent monomer units,
    (c') other monoethylenically unsaturated monomers which are free of nitrile groups.

11. The aqueous slurry of claim 1 wherein said water-soluble amphoteric copolymer-further comprises as constituent monomer units,
    (d) compounds which have at least two ethylenically unsaturated double bonds in the molecule which are at least one compound selected from the group consisting of methylenebisacrylamide, glycol diacrylate, glycol dimethacrylate, glyceryl triacrylate, pentaerythrityl triallyl ether, polyalkylene glycols which are at least diesterified with acrylic acid and/or methacrylic acid, polyols which are at least diesterified with acrylic acid and/or methacrylic acid.

12. The aqueous slurry of claim 11, wherein said compounds which have at least two ethylenically unsaturated double bonds are a polyol which is at least diesterified with acrylic acid and/or methacrylic acid, wherein said polyol is at least one of pentaerythritol, sorbitol or glucose.

13. The aqueous slurry as claimed in claim 1 wherein said water-soluble amphoteric copolymer further comprises as constituent monomer units (c') up to 30 mol % of units of other monoethylenically unsaturated compounds which are free of nitrile groups.

14. A process for the preparation of an aqueous slurry as claimed in claim 1, wherein from 0.1 to 5% by weight, based on filler, of said amphoteric water-soluble copolymer is added to an aqueous slurry of at least one finely divided filler, or the aqueous slurry of at least one finely divided filler is introduced into an aqueous solution of said water-soluble amphoteric copolymer and the components are mixed in each case.

15. A process as claimed in claim 14, wherein the electrophoretic mobility of the finely divided filler particles of the aqueous slurry is negative or not more than zero at a pH of 7.

16. The process of claim 14, wherein said water-soluble amphoteric copolymer further comprises as constituent monomer units, (c') other monoethylenically unsaturated monomers which are free of nitrile groups.

17. The process of claim 16, wherein said water-soluble amphoteric copolymer further comprises as constituent monomer units (d) compounds which have at least two ethylenically unsaturated double bonds in the molecule which are at least one compound selected from the group consisting of methylenebisacrylamide, glycol diacrylate, glycol dimethacrylate, glyceryl triacrylate, pentaerythrityl triallyl ether, polyalkylene glycol which is at least diesterified with acrylic acid and/or methacrylic acid, a polyol which is at least diesterified with acrylic acid and/or methacrylic acid.

18. The aqueous slurry of claim 17, wherein said compounds which have at least two ethylenically unsaturated double bonds are a polyol which is at least diesterified with acrylic acid and/or methacrylic acid, wherein said polyol is at least one of pentaerythritol, sorbitol or glucose.

19. A method of filling comprising adding the aqueous slurry as claimed in claim 1 to a paper stock and draining said paper stock, in the production of a material selected from the group consisting of paper, cardboard and board.

\* \* \* \* \*

UNITED STATES PATENT AND TRADEMARK OFFICE
CERTIFICATE OF CORRECTION

| | | |
|---|---|---|
| PATENT NO. | : 7,951,265 B2 | |
| APPLICATION NO. | : 11/082904 | |
| DATED | : May 31, 2011 | |
| INVENTOR(S) | : Anton Esser et al. | |

It is certified that error appears in the above-identified patent and that said Letters Patent is hereby corrected as shown below:

On the title page, Item (30), the Foreign Application Priority Data has been Omitted. Item (30) should read -- (30)         Foreign Application Priority Data

Apr. 3, 2003      (DE) ........................................ 10315363.2 --

Signed and Sealed this
Sixteenth Day of August, 2011

David J. Kappos
*Director of the United States Patent and Trademark Office*